US011884097B2

(12) United States Patent
Kalwa et al.

(10) Patent No.: US 11,884,097 B2
(45) Date of Patent: Jan. 30, 2024

(54) METHOD FOR PRODUCING AN ABRASION-RESISTANT WOOD MATERIAL PANEL AND PRODUCTION LINE THEREFOR

(71) Applicant: Flooring Technologies Ltd., Kalkara (MT)

(72) Inventors: Norbert Kalwa, Horn-Bad Meinberg (DE); Ingo Lehnhoff, Dierhagen (DE)

(73) Assignee: Flooring Technologies Ltd., Kalkara (MT)

( * ) Notice: Subject to any disclaimer, the term of this patent is extended or adjusted under 35 U.S.C. 154(b) by 0 days.

(21) Appl. No.: 17/525,088

(22) Filed: Nov. 12, 2021

(65) Prior Publication Data

US 2022/0072897 A1 Mar. 10, 2022

Related U.S. Application Data

(63) Continuation of application No. 16/099,547, filed as application No. PCT/EP2017/060710 on May 4, 2017, now Pat. No. 11,192,398.

(30) Foreign Application Priority Data

May 20, 2016 (EP) .................................... 16170640

(51) Int. Cl.
*B44C 5/04* (2006.01)

(52) U.S. Cl.
CPC .......... *B44C 5/0476* (2013.01); *B44C 5/0492* (2013.01)

(58) Field of Classification Search
CPC .................................................... B44C 5/0476
See application file for complete search history.

(56) References Cited

U.S. PATENT DOCUMENTS 3,705,830 A 12/1972 Gurgui et al.
4,940,503 A 7/1990 Lindgren et al.
(Continued)

FOREIGN PATENT DOCUMENTS

CA 2283835 A1 8/1999
CH 648979 A3 4/1985
(Continued)

OTHER PUBLICATIONS

Merline et al., "Melamine formaldehyde: curing studies and reaction mechanism", Polymer Journal, 2013, pp. 413-419, vol. 45.
(Continued)

*Primary Examiner* — Ian A Rummel
(74) *Attorney, Agent, or Firm* — The Webb Law Firm

(57) ABSTRACT

A production line for producing an abrasion-resistant wood-composite panel that has a decorative layer, the production line including a first application device for applying a resin layer to an upper and/or lower side of a core board, a scattering device for scattering abrasion-resistant particles controlled by a light barrier and arranged downstream of the first application device in a direction of processing, a first resin drying device arranged downstream of the first application device and scattering device, a second resin application device for applying a second resin layer to an upper and/or lower side of the core board arranged downstream of the first resin drying device, a second resin drying device arranged downstream of the second application device, and at least one short-cycle press.

11 Claims, 1 Drawing Sheet

(56) References Cited

U.S. PATENT DOCUMENTS

| | | | | |
|---|---|---|---|---|
| 6,465,046 | B1 | 10/2002 | Hansson et al. | |
| 6,555,216 | B2 | 4/2003 | Chen et al. | |
| 8,173,240 | B2 | 5/2012 | Dohring | |
| 8,512,804 | B2 | 8/2013 | Oldorff | |
| 8,632,875 | B2 | 1/2014 | Oldorff | |
| 8,955,281 | B2 | 2/2015 | Pietruczynik et al. | |
| 8,969,219 | B2 | 3/2015 | Gvishi | |
| 8,993,049 | B2 | 3/2015 | Pervan | |
| 9,321,299 | B2 | 4/2016 | Hansson et al. | |
| 9,365,028 | B2 | 6/2016 | Vogel et al. | |
| 9,434,206 | B2 | 9/2016 | Hoff | |
| 9,757,974 | B2 | 9/2017 | Kalwa | |
| 9,994,010 | B2 | 6/2018 | Pervan | |
| 10,094,123 | B2 | 10/2018 | Meersseman et al. | |
| 10,406,558 | B2 | 9/2019 | Dohring et al. | |
| 11,192,398 | B2 | 12/2021 | Kalwa et al. | |
| 2001/0049022 | A1 | 12/2001 | Takeuchi et al. | |
| 2004/0086678 | A1 | 5/2004 | Chen et al. | |
| 2006/0240247 | A1 | 10/2006 | Haller | |
| 2008/0000182 | A1 | 1/2008 | Pervan | |
| 2010/0080896 | A1 | 4/2010 | Bachmann | |
| 2010/0098963 | A1 | 4/2010 | Dohring et al. | |
| 2010/0221493 | A1 | 9/2010 | Hintze | |
| 2011/0117340 | A1 | 5/2011 | Oldorff | |
| 2011/0217463 | A1* | 9/2011 | Oldorff | B44C 5/0476 427/209 |
| 2012/0015176 | A1 | 1/2012 | Riebel et al. | |
| 2014/0017452 | A1 | 1/2014 | Pervan et al. | |
| 2014/0044958 | A1 | 2/2014 | Steinmann et al. | |
| 2014/0255670 | A1 | 9/2014 | Kalwa | |
| 2014/0290171 | A1 | 10/2014 | Vermeulen | |
| 2015/0030817 | A1 | 1/2015 | Wiegelmann et al. | |
| 2015/0064421 | A1 | 3/2015 | Dohring | |
| 2015/0097907 | A1 | 4/2015 | Kalwa et al. | |
| 2015/0197942 | A1 | 7/2015 | Pervan et al. | |
| 2016/0016390 | A1 | 1/2016 | Lundblad et al. | |
| 2017/0217121 | A1 | 8/2017 | Maier et al. | |
| 2017/0314273 | A1 | 11/2017 | Hugi et al. | |
| 2017/0370111 | A1 | 12/2017 | Troendle et al. | |
| 2018/0002939 | A1 | 1/2018 | Harve et al. | |
| 2018/0080867 | A1 | 3/2018 | Denk et al. | |
| 2018/0339504 | A1 | 11/2018 | Ziegler et al. | |
| 2019/0160859 | A1 | 5/2019 | Kalwa et al. | |
| 2020/0376886 | A1 | 12/2020 | Denk et al. | |
| 2022/0212229 | A1 | 7/2022 | Kalwa et al. | |

FOREIGN PATENT DOCUMENTS

| | | | |
|---|---|---|---|
| CN | 1084786 | A | 4/1994 |
| CN | 101374655 | A | 2/2009 |
| CN | 101608417 | A | 12/2009 |
| CN | 101712166 | A | 5/2010 |
| CN | 102086616 | A | 6/2011 |
| CN | 102171057 | A | 8/2011 |
| CN | 102264802 | A | 11/2011 |
| CN | 102294722 | A | 12/2011 |
| CN | 102083636 | B | 6/2013 |
| CN | 103526910 | A | 1/2014 |
| CN | 103764404 | A | 4/2014 |
| CN | 104220272 | A | 12/2014 |
| CN | 104314272 | A | 1/2015 |
| CN | 104520080 | A | 4/2015 |
| CN | 104640643 | A | 5/2015 |
| CN | 104870203 | A | 8/2015 |
| CN | 204551953 | U | 8/2015 |
| CN | 105307869 | A | 2/2016 |
| CN | 207449270 | U | 6/2018 |
| CN | 108864590 | A | 11/2018 |
| CN | 109153283 | A | 1/2019 |
| CN | 113874128 | A | 12/2021 |
| DE | 102004031547 | A1 | 3/2005 |
| DE | 102004032058 | A1 | 5/2005 |
| DE | 102008046749 | A1 | 3/2010 |
| DE | 102010036454 | A1 | 1/2012 |
| DE | 10117807 | B4 | 7/2012 |
| DE | 202011110956 | U1 | 11/2017 |
| EP | 0329154 | B1 | 11/1993 |
| EP | 1084317 | B1 | 4/2003 |
| EP | 1820640 | B1 | 5/2010 |
| EP | 2314381 | A1 | 4/2011 |
| EP | 2189282 | B1 | 5/2011 |
| EP | 2463116 | B1 | 11/2013 |
| EP | 2700508 | A1 | 2/2014 |
| EP | 2774770 | B1 | 4/2015 |
| EP | 2977219 | A1 | 1/2016 |
| EP | 3246175 | A1 | 11/2017 |
| EP | 3338993 | A1 | 6/2018 |
| EP | 3351402 | B1 | 4/2019 |
| EP | 3480030 | A1 | 5/2019 |
| JP | H11156818 | A | 6/1999 |
| JP | 20153400 | A | 1/2015 |
| JP | 2017503688 | A | 2/2017 |
| JP | 2017113696 | A | 6/2017 |
| NL | 6900898 | A | 7/1969 |
| RU | 2015886 | C1 | 7/1994 |
| RU | 2419495 | C2 | 5/2011 |
| WO | 9317182 | A1 | 9/1993 |
| WO | 0148333 | A1 | 7/2001 |
| WO | 2006002917 | A2 | 1/2006 |
| WO | 2007042258 | A1 | 4/2007 |
| WO | 2010112125 | A1 | 10/2010 |
| WO | 2011045690 | A2 | 4/2011 |
| WO | 2011076305 | A1 | 6/2011 |
| WO | 2014029887 | A1 | 2/2014 |
| WO | 2015152802 | A1 | 10/2015 |
| WO | 2016082066 | A1 | 6/2016 |
| WO | 2016114710 | A1 | 7/2016 |
| WO | 2017198474 | A1 | 11/2017 |
| WO | 2018067641 | A1 | 4/2018 |
| WO | 2018198034 | A1 | 11/2018 |
| WO | 2018217158 | A1 | 11/2018 |

OTHER PUBLICATIONS

"Particle Board vs Oriented Strand Board: How Are They Different?", 2015, pp. 1-3. Retrieved from https://www.web.archive.org/web/20150826012716/https://www.builddirect.com/learning-center/building-materials/particleboard-oriented-strand/.
Xu et al., "The effect of fillers on the wear resistance of thermoplastic polymeric coatings", Wear, 2001, pp. 1522-1531, vol. 251.
Baugh et al. "Diving Deep Into the Invasion of LVT and The Impact on the Flooring Industry", Building Products Industry Update, Sep. 4, 2018, pp. 1-31.
"Grundierung", Wikipedia, Oct. 27, 2018, pp. 1-2 (English-Language Translation).
Zhai, "Portable Manual for applying decorative materials", Beijing Hope Electronic Press, Aug. 2018, pp. 160-161 (English-Language Translation).
Zhu et al. "Furniture Surface Coating", Northeast Forestry University Press, Aug. 2016, pp. 83-84 (English-Language Translation).
Thompson et al. "Fatigue in wood-based panels. Part 1: The strength variability and fatigue performance of OSB, chipboard and MDF", Wood Science and Technology, 2002, pp. 255-269, vol. 36.

* cited by examiner

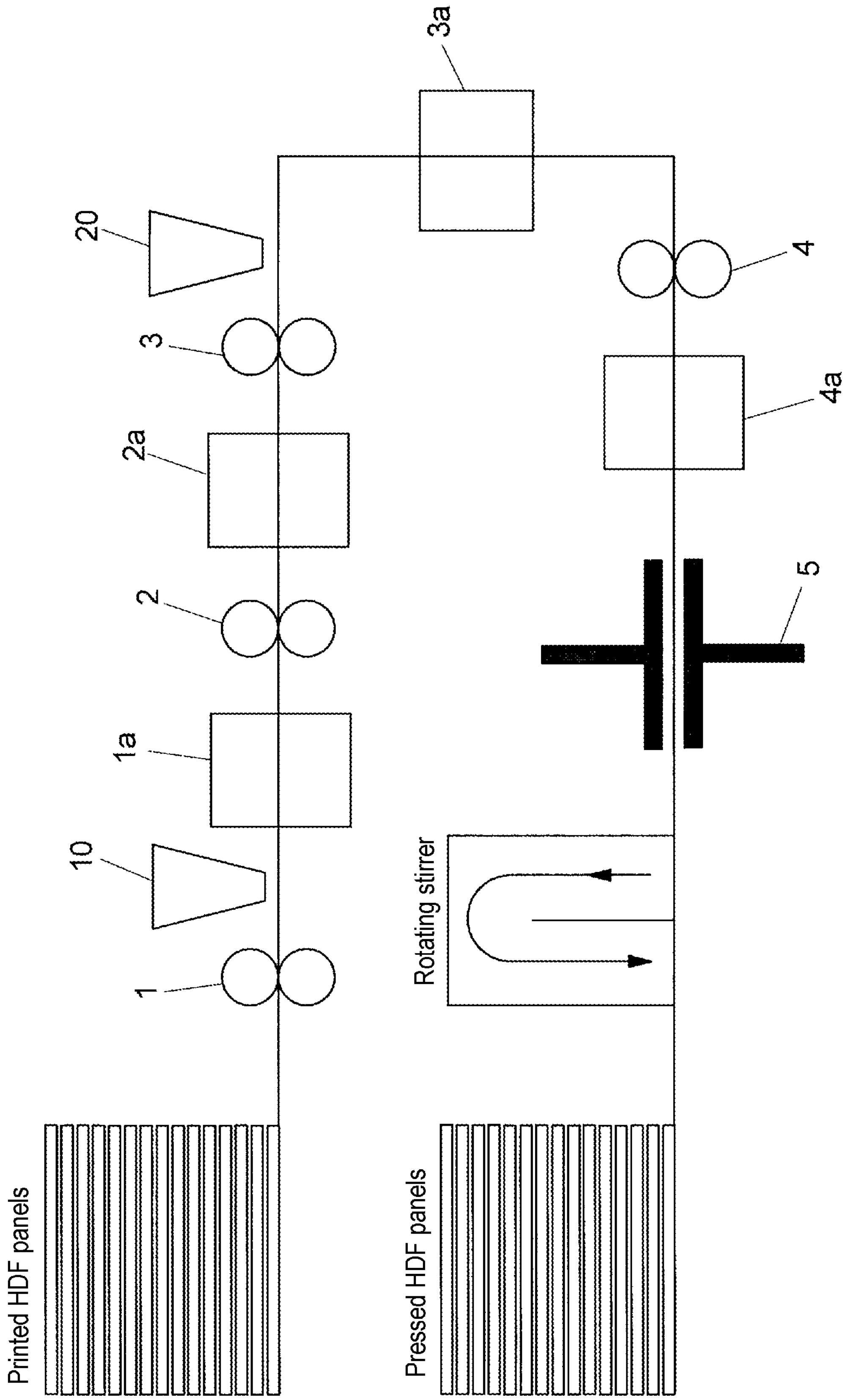
3a
20
3
2a
2
1a
10
1
4
4a
5
Rotating stirrer
Printed HDF panels
Pressed HDF panels

METHOD FOR PRODUCING AN ABRASION-RESISTANT WOOD MATERIAL PANEL AND PRODUCTION LINE THEREFOR

CROSS-REFERENCE TO RELATED APPLICATIONS

This application is a continuation of U.S. patent application Ser. No. 16/099,547 filed Nov. 7, 2018, which is the United States national phase of International Application No. PCT/EP2017/060710 filed May 4, 2017, and claims priority to European Patent Application No. 16170640.3 filed May 20, 2016, the disclosures of which are hereby incorporated in their entirety by reference.

BACKGROUND OF THE INVENTION

Field of the Invention

The present invention relates to a process for the production of an abrasion-resistant wood-composite panel, to a production line for the conduct of said process, and to a wood-composite panel.

Description of Related Art

Many products and product surfaces exposed to wear caused by aggressive mechanical effects require application of wear-resistant layers so that this wear does not cause premature damage or destruction. Examples of these products are furniture, floors, panels used in the fitting-out of interiors, etc. In order to guarantee maximized service life to the user, various protective measures have to be adopted here, as required by the frequency and magnitude of the aggressive effects.

Many of the abovementioned products have decorative surfaces which, when they are subject to wear caused by intensive use, radically become unattractive and/or can no longer be cleaned. These decorative surfaces very often consist of papers which have been impregnated with thermoset resins and which are pressed, in what are known as short-cycle processes, onto the wood-composite cores that are used. A thermoset resin very frequently used is melamine-formaldehyde resin.

Materials known as overlay papers, which are thin papers comprising α-cellulose, already have a long history of use as protection for these decorative surfaces. When said papers have been impregnated with melamine-formaldehyde resins and pressed on the decorative papers, they have high transparency, and there is therefore no, or only slight, impairment of the visual impact of the decorative effect.

However, these overlay papers do not always provide adequate improvement of wear resistance. Overlay solutions have been adequate for a kitchen worktop or for a counter, but are not adequate for surfaces subject to more aggressive effects, or indeed floors. One solution here would be to increase the grammage of the overlay paper. However, undesired losses of visual impact then occur. For certain applications, moreover, an overlay paper alone is inadequate.

For this reason an alternative solution has been adopted: introduction, into the resin solutions used for impregnation, of minerals which produce improved wear resistance in the overlay paper. These were applied to the surface of the papers with the aid of doctoring systems or slot dies. Other methods use scattering devices or spray devices to apply the minerals, mainly corundum (aluminum oxide), to the impregnated papers.

Technical implementation of these approaches was easy, particularly because the papers used were continuous webs. This continuous web runs through the impregnation unit and the corundum can then be applied thereto at a suitable point. For a very wide variety of reasons, this technology is unsuitable for use with materials that are not continuous webs. Firstly, the paper requires guiding through the applicator, and in non-continuous operation this would necessitate constant repetition of a threading process. Secondly, the resin solution would pass through the applicator between the individual paper sheets, and would have to be collected and returned to the process.

It has been found during application of the melamine resin comprising corundum that problems arise due to sedimentation caused by the density differences between the melamine resin and the corundum. The sedimentation leads to deposits in batch containers, pumps, piping, and the roll-applicator assemblies. It is therefore necessary firstly to carry out frequent cleaning in order to free the entire area from deposits, and secondly to operate with increased corundum application to achieve a particular level of wear-protection. The abovementioned sedimentation also leads to lack of homogeneity in the applicator units, and this likewise has to be compensated by increasing the quantity applied. Another serious disadvantage of this technology is that the resin formulations comprising corundum cause considerable wear to all of the plant components that come into contact with the resin formulation. The combination of the increased quantities applied with the problems of sedimentation in turn leads to poorer transparency at higher levels of wear-protection. This has a particularly noticeable adverse effect in the case of dark-colored decorative effects.

A further problem caused by formulations comprising corundum in the subsequent process step of pressing is press-platen wear, which increases with increasing application rates of corundum in g per square meter, and also increases as the extent of protective covering said corundum by corundum-free resin layers decreases. For this reason alone, the quantity of corundum required to achieve a required abrasion performance value should be minimized. Higher consumption of corundum also of course implies higher costs and unnecessary consumption of resources.

A further problem is that resin batches with corundum age rapidly during plant stoppages. These then require disposal. This leads to increased disposal costs and increased materials usage.

Another problem is that it is impossible to achieve effective quality control on the production line. The resin formulation merely states an approximate value for the quantity of corundum that should be present on the surface. The application losses due to sedimentation, viscosity variations and inhomogeneity are difficult to estimate. This type of process therefore has to be accompanied by very frequent determination of abrasion performance. In the case of higher levels of wear-protection, this determination takes a number of hours, and this is of course inimical to effective process control. Nor can the costs of testing be ignored. The above applies not only to application to paper webs but also to application to (printed) sheet materials.

A variety of disadvantages are therefore encountered: poor distribution of the corundum in the resin solution, a high level of wear to the plant components (pumps, rollers, etc.), increased usage of corundum, poor process control, poor transparency and increased costs.

SUMMARY OF THE INVENTION

The present invention is therefore based on a technical object of reliable achievement of high abrasion values, in particular abrasion classes AC4 to AC6, together with a low level of press-platen wear. The intention was in particular to achieve this for a process intended to process printed panels in a very wide variety of formats. The intention here was, if possible, to achieve process simplification and at least no cost increase. A novel process should as far as possible eliminate the disadvantages discussed above. Said process should also permit effective quality monitoring that rapidly delivers information relating to the current process.

The object addressed is achieved in the invention via a process as described herein and a production line as described herein.

Accordingly, a process is provided for the production of an abrasion-resistant wood-composite panel, where at least one decorative layer, in particular in the form of printed decorative effect, has been provided on the upper side. The present process comprises the following steps:

- application of at least one first resin layer to the at least one decorative layer on the upper side and to the underside of the wood-composite panel,
- uniform scattering of abrasion-resistant particles onto the first resin layer on the upper side of the wood-composite panel;
- in at least one drying device, drying of the first resin layer to which the abrasion-resistant particles have been provided on the upper side, and of the first resin layer on the underside of the wood-composite panel;
- application of at least one second resin layer onto the dried first resin layer to which the abrasion-resistant particles have been provided on the upper side, and onto the dried first resin layer on the underside, of the wood-composite panel;
- in at least one drying device, drying of the respective second resin layer on the upper side and the underside of the wood-composite panel; and
- pressing of the layer structure.

The present process accordingly permits the provision, in a non-continuous process at low cost, of wood-composite panels in various formats (i.e. in the form of unitized product rather than in the form of a continuous web) with high wear resistance, where said panels have a decorative layer. The present process applies a first resin layer, in particular in the form of a first thermoset resin layer, for example of a melamine-formaldehyde resin layer, to the decorative layer (pretreated or not pretreated) of the wood-composite panel. This is not immediately followed by any drying or incipient drying of the first resin layer, but instead a suitable scattering device is used to scatter the abrasion-resistant particles uniformly onto the first resin layer, which is wet or still liquid, on the upper side of the wood-composite panel. Because the first resin layer is still in liquid form when the scattering takes place, the abrasion-resistant particles can sink into the resin layer. Only after the scattering of the abrasion-resistant particles onto the first resin layer does a drying step take place, e.g. with use of a convection dryer, whereupon the abrasion-resistant particles become fixed in the at least one first resin layer. The location of the abrasion-resistant particles is therefore in a first resin layer, which has been provided directly on the decorative layer and which is covered by at least one further resin layer, preferably by a plurality of further resin layers. The abrasion-resistant particles have accordingly not been provided in an exterior protective covering layer, (and accordingly also do not protrude out of the resin layer) but instead have been provided in a lower resin layer. Specifically the protective covering of the abrasion-resistant particles by further resin layers can reduce press-platen wear. It should also be noted that the introduction of the abrasion-resistant particles does not serve to provide slip-resistant (non-slip) panels, but instead is intended to provide protection from abrasion to the decorative layer, which has preferably been applied by direct printing.

As is explained in detail at a later stage below, the scattering device or scattering apparatus used in the present process can also scatter other scatterable materials (for example glass beads, cellulose fibers, wood fibers, etc.). By virtue of the scattering of all of the abrasion-resistant material (such as corundum) in one layer, instead of multiple application by the applicator rolls, it is possible to use subsequent resin layers to create a markedly better barrier between the layer made of abrasion-resistant material and the press-platen. Press-platen wear is thus reduced. It is also reduced via the smaller quantity that has to be applied in order to achieve a particular abrasion resistance.

With the present process, it is possible to reduce the usage of abrasion-resistant material, wear to the plant is reduced, e.g. wear to the press-platen or to the resin supply lines, application of abrasion-resistant material to the wood-composite panel is more uniform, and transparency is improved. The overall effect is reduction of process costs because of reduced costs of materials and maintenance. In addition, determination of the quantities of abrasion-resistant material applied becomes easier, and quality control therefore also becomes easier, as explained in detail at a later stage below.

The quantity of the first resin layer applied to the upper side of the wood-composite panel can be from 50 to 100 $g/m^2$, preferably from 60 to 80 $g/m^2$, with particular preference 70 $g/m^2$. The quantity of the first resin layer applied to the underside of the wood-composite panel can be from 50 to 100 $g/m^2$, preferably from 60 to 80 $g/m^2$, with particular preference 60 $g/m^2$. It is preferable that the first lower resin layer is a colored (e.g. brownish) layer, thus simulating a counterbalancing layer.

The solids content of the resin used for the first resin layer, not only for the upper side but also for the underside, is from 50 to 70% by weight, preferably from 50 to 60% by weight, with particular preference 55% by weight.

It is preferable that the first resin layer is applied in parallel or simultaneously to the upper side and underside of the wood-composite panel in at least one double-applicator device (roll-applicator assembly).

The resin layer(s) applied on the underside act as a counterbalancing layer. Application of the resin layers to the upper side and underside of the wood-composite panels in approximately the same quantities ensures that the tensile forces resulting from the applied layers during pressing, and acting on the wood-composite panel, have a mutually compensatory effect. The counterbalancing layer applied to the underside corresponds approximately in terms of layer structure and respective layer thickness to the layer sequence applied on the upper side, except for the abrasion-resistant particles and glass beads, as explained in detail below.

The abrasion-resistant particles used to increase wear resistance preferably comprise corundum (aluminum oxide), boron carbide, silicon dioxide, silicon carbide, particular preference being given here to use of corundum.

In one embodiment, the quantity of abrasion-resistant particles scattered is from 10 to 50 $g/m^2$, preferably from 10 to 30 $g/m^2$, with particular preference from 15 to 25 $g/m^2$.

It is therefore possible by way of example to scatter 14 g/$m^2$ or 23 g/$m^2$ of abrasion-resistant particles.

In one embodiment, abrasion-resistant particles with grain size from 50 to 100 μm, preferably from 70 to 100 μm, are used. In particular, a quantity of from 10 to 30 g/$m^2$, preferably from 15 to 20 g/$m^2$, of abrasion-resistant particles with grain size from to 90 μm, preferably from 53 to 75 μm, is scattered. In a particularly preferred embodiment, a quantity of 20 g/$m^2$ of abrasion-resistant particles with grain size from 70 to 90 μm is scattered.

Abrasion-resistant particles with grain sizes in the classes F180 to F220 are used, preference being given to F200. The grain size for class F180 comprises a range from 53 to 90 μm, and that for F220 comprises a range from 45 to 75 μm (FEPA standard). In one variant, abrasion-resistant particles used are white fused corundum with predominant grain size in the range from 53 to 75 μm. A particularly preferred embodiment uses corundum particles in class F200, where F200 is a mixture of F180 with F220.

Abrasion-resistant particles with a smaller particle size equal to or below 40 μm are, in contrast, not suitable for the scattering procedure because the proportion of fines here, and therefore the quantity of dust arising, is excessive, and secondly these grain sizes do not have sufficient flowability. These fine particles can lead to undesired turbulence effects in particular in a discontinuous scattering process as in the present case.

A simple and precise method can be used to determine the quantity of abrasion-resistant material applied to the wood panel. This can be achieved simply by placing one or more flat receptacles below the scattering device or the scattering assembly. The scattering device is then operated for a certain defined period, the quantity of abrasion-resistant material collected in the receptacles is weighed, and the weighed quantity of abrasion-resistant material is divided by the velocity of forward motion in the plant. It is thus easily possible by way of example to determine the difference between left-hand side, center and right-hand side, and the precision across the width of the scattering device here should be +/−1 g/$m^2$.

The quantity of the second resin layer applied to the upper side of the wood-composite panel can be from 10 to 50 g/$m^2$, preferably from 20 to 30 g/$m^2$, with particular preference 25 g/$m^2$.

The quantity of the second resin layer applied to the underside of the wood-composite panel can be from 30 to 80 g/$m^2$, preferably from 40 to 60 g/$m^2$, with particular preference 50 g/$m^2$.

The solids content of the resin used for the second resin layer, both for the upper side and for the underside, is from 50 to 70% by weight, preferably from 50 to 60% by weight, with particular preference 55% by weight.

In another embodiment of the present process, at least one third resin layer is applied respectively to the upper side and the underside of the wood-composite panel, i.e. to the respective second (dry) resin layer.

The quantity of the third resin layer applied to the upper side of the wood-composite panel can be from 10 to 40 g/$m^2$, preferably from 15 to 30 g/$m^2$, with particular preference 20 g/$m^2$, where the solids content is from 50 to 80% by weight, preferably from 60 to 70% by weight, with particular preference from 60 to 65% by weight, e.g. 61.5% by weight.

In one variant, the resin to be applied as third resin layer to the upper side of the wood-composite panel can comprise glass beads, where the glass beads preferably function as spacers. The diameter of the glass beads preferably used is from 50 to 100 μm, preferably from 60 to 80 μm. The quantity applied to the glass beads, when these are applied together with the third resin layer, is from 1 to 5 g/$m^2$, preferably from 2 to 4 g/$m^2$, with particular preference 3 g/$m^2$.

In another variant, the glass beads can be scattered onto the third resin layer applied on the upper side of the wood-composite panel. In this case, i.e. if the glass beads are scattered, the quantity applied to the glass beads is from 5 to 10 g/$m^2$, preferably from 6 to 8 g/$m^2$, with particular preference 6 g/$m^2$.

The quantity of the third resin layer applied to the underside of the wood-composite panel can be from 20 to 70 g/$m^2$, preferably from 30 to 50 g/$m^2$, with particular preference 40 g/$m^2$, with a solids content from 50% to 70% by weight, preferably from 50 to 60% by weight, with particular preference 55% by weight.

It is likewise advantageous that the third resin layer applied respectively on the upper side and underside of the wood-composite panel is dried in at least one drying device.

Following the drying process for the third resin layer, it is optionally possible to apply respectively at least one fourth resin layer to the upper side and the underside of the wood-composite panel, i.e. to the respective third resin layer.

The quantity of the fourth resin layer applied on the upper side of the wood-composite panel can be from 10 to 40 g/$m^2$, preferably from 15 to 30 g/$m^2$, with particular preference 20 g/$m^2$, with solids content from 50 to 80% by weight, preferably from 60 to 70% by weight, with particular preference from 60 to 65% by weight, e.g. 61.6% by weight.

In a further-developed variant of the present process, the resin applied as fourth resin layer to the upper side of the wood-composite panel can comprise fibers and/or glass beads, in particular wood fibers or cellulose fibers. If glass beads are added to the resin that is to be applied, the quantity of glass beads applied is from 1 to 5 g/$m^2$, preferably from 2 to 4 g/$m^2$, with particular preference 3 g/$m^2$. The quantity applied of the fibers, e.g. cellulose fibers, when these are applied together with the fourth resin layer, is from 0.1 to 0.5 g/$m^2$, preferably from 0.2 to 0.4 g/$m^2$, with particular preference 0.25 g/$m^2$. Addition of fibers and/or glass beads, for example cellulose fibers, to the uppermost fourth layer contributes to the wear resistance of the wood-composite panel.

The quantity of the fourth resin layer applied to the underside of the wood-composite panel can be from 10 to 60 g/$m^2$, preferably from 20 to 50 g/$m^2$, with particular preference 30 g/$m^2$, with a solids content from 50 to 70% by weight, preferably from 50 to 60% by weight, with particular preference 55% by weight.

It should also be noted that other additives, such as hardeners, wetting agents, antifoams and/or release agents, can be added to any or all of the resin layers.

The fourth resin layer applied respectively on the upper side and underside of the wood-composite panel is then dried in at least one further drying device. The respective resin layers are preferably dried to a residual moisture content of from 6 to 9% by weight, for example in a convection dryer.

In the pressing step that follows the final drying step, the layer structure is pressed with exposure to pressure and heat in a short-cycle press at temperatures of from 150 to 250° C., preferably from 180 to 230° C., with particular preference at 200° C., and at a pressure of from 100 to 1000 N/$cm^2$, preferably from 300 to 700 N/$cm^2$, with particular preference from 400 to 600 N/$cm^2$.

In one variant of the present process, the wood-composite panel or core board used comprises medium-density fiberboard (MDF), high-density fiberboard (HDF), oriented strand board (OSB) or plywood board, cement fiberboard and/or gypsum fiberboard, wood-plastic board, in particular wood-plastic-composite (WPC) board.

The abovementioned decorative layer can be applied by means of direct printing. When direct printing is used, this applies a water-based, pigmented printing ink in the intaglio printing process or in the digital printing process, and the water-based pigmented printing ink can be applied here in more than one layer, e.g. in the form of from 2 to 10 layers, preferably from 3 to 8 layers.

When direct printing is used, the at least one decorative layer is applied as mentioned by means of an analog intaglio printing process and/or of a digital printing process. The intaglio process is a printing technique in which the elements to be replicated are present as depressions in a printing plate which is coated with ink before the printing process. The printing ink is located mainly in the depressions, and is transferred to the item to be printed, e.g. a wood-fiber core board, by virtue of pressure applied by the printing plate, and of adhesion forces. In the case of digital printing, in contrast, the print image is transferred directly by a computer into a printing machine, e.g. a laser printer or inkjet printer. No static printing plate is used here. Both processes can use aqueous inks or UV-based colorants. Combination of the printing techniques mentioned, intaglio printing and digital printing, is also conceivable. A suitable combination of the printing techniques can firstly be achieved directly on the core board or on the layer that is to be printed, or else can be achieved by appropriate modification of the electronic data sets used, before printing.

It is likewise possible that there is at least one basecoat layer arranged between the wood-composite panel or core board and the at least one decorative layer.

The basecoat layer preferably used here comprises a composition made of casein as binder and comprises inorganic pigments, in particular inorganic color pigments. Color pigments used in the basecoat layer can be white pigments such as titanium dioxide, or else other color pigments, for example calcium carbonate, barium sulfate or barium carbonate. The basecoat can also comprise water as solvent, alongside the color pigments and the casein. It is likewise preferable that the pigmented basecoat layer applied consists of at least one sublayer or coat, preferably of at least two sublayers or coats, with particular preference of at least four sublayers or coats applied in succession, where the quantity applied can be identical or can differ from one sublayer or coat to the next.

The present process therefore permits production of an abrasion-resistant wood-composite panel with at least one decorative layer on the upper side, at least one first resin layer on the upper side and underside, at least one layer made of abrasion-resistant particles on and/or in the first resin layer on the upper side, and at least one second resin layer on the upper side and underside of the wood-composite panel.

A further-developed embodiment has at least one third and fourth resin layer on the upper side and underside of the wood-composite panel, and the third and fourth resin layer provided on the upper side of the wood-composite panel can respectively comprise fibers and/or glass beads, in particular cellulose fibers.

In a preferred embodiment, the present process permits production of an abrasion-resistant wood-composite panel with the following layer structure (viewed upward from below):

counterbalancing layer made of four resin layers—core board-coat layer-printed decorative layer-first resin layer-layer made of abrasion-resistant particles-second resin layer-third resin layer with glass beads-fourth resin layer with glass beads and/or cellulose fibers.

The production line for the conduct of the present process comprises the following elements:

- at least one first application device for the application of a first resin layer to the upper side and/or underside of the core board,
- at least one device arranged behind the first application device in the direction of processing for the scattering of a predetermined quantity of abrasion-resistant particles;
- at least one first drying device arranged behind the first application device and scattering device in the direction of processing for the drying of the first upper and/or lower resin layer;
- at least one second application device arranged behind the first drying device in the direction of processing for the application of a second resin layer to the upper side and/or underside of the core board,
- at least one second drying device arranged behind the second application device in the direction of processing for the drying of the second upper and/or lower resin layer; and
- at least one press device, in particular a short-cycle press, for the pressing of the layer structure.

In a preferred embodiment, the production line for the conduct of the present process moreover comprises

- at least one third application device arranged behind the second drying device in the direction of processing for the application of a third resin layer to the upper side, which by way of example can comprise glass beads, and/or underside of the core board (without glass beads),
- at least one third drying device arranged behind the third application device in the direction of processing for the drying of the third upper and lower resin layer;
- at least one fourth application device arranged behind the third drying device in the direction of processing for the application of a fourth resin layer, which by way of example can comprise fibers and/or glass beads and/or glass particles, to the upper side and/or underside of the core board (without fibers or glass beads);
- at least one fourth drying device arranged behind the fourth application device in the direction of processing for the drying of the fourth upper and lower resin layer; and
- at least one short-cycle press arranged behind the fourth drying device in the direction of processing.

The scattering apparatus or scattering device has accordingly been installed in a production line in which by way of a plurality of roll-applicator units aqueous resins can be applied to base coated and printed panels. At the start of the process, a resin coat is applied to unitized boards, and the scattering device is then used to scatter the abrasion-resistant material, for example corundum, into said coat.

The scattering device provided in the present production line is suitable for the scattering of powder, granules and fibers, and comprises an oscillating brush system. The scattering device consists in essence of a hopper, a rotating structured roll and a scraper. The quantity of abrasion-resistant material applied here is determined by way of the velocity of rotation of the roll.

One embodiment of the present production line moreover provides that the at least one scattering device is surrounded by, or arranged in, at least one compartment which has at least one means for the removal of dusts arising in the compartment. The means for the removal of the dusts can take the form of a suction-removal device or else of a device for blowing air into said compartment. Air can be blown into said compartment by way of nozzles installed at the panel inlet and panel outlet. These can additionally prevent production of an inhomogeneous scattering curtain of abrasion-resistant material as a result of air movements.

It is advantageous to remove the dust made of abrasion-resistant material from the environment of the scattering device, not only because of the obviously adverse effect on the health of the operators working on the production line, but also because the fine dust made of abrasion-resistant particles also deposits on other plant components of the production line and leads to increased wear to same. The arrangement of the scattering device in a compartment therefore serves not only to reduce the adverse effects to health of dust in the environment of the production line but also to prevent premature wear.

It is preferable to use a light barrier to control the scattering device, the arrangement of the light barrier here being, in the direction of processing, before the roll (scattering roll) provided below the scattering device. Use of a light barrier to control the scattering device is advisable because between the individual wood-composite panels there are relatively large gaps. Said light barrier initiates the scattering process as soon as there is a panel located before the scattering roll.

In one embodiment of the present scattering device, before the scattering roll there is at least one hopper provided for the collection of excess abrasion-resistant particles (i.e. abrasion-resistant particles which fall from the scattering roll before the transport device has introduced the wood-composite panel underneath same, and are not scattered on the at least one wood-composite panel).

Coupled to the hopper in a further-advanced variant, there is at least one conveyor and one sieve device, where the excess abrasion-resistant material collected in the hopper is transported by way of the conveyor to the sieve device. The sieve meshes of the sieve device correspond to the largest grain size used in the abrasion-resistant particle material (i.e. about 80-100 μm). Dirt particles and caked material (for example caked resin or caked abrasion-resistant material) are removed in the sieve device from the abrasion-resistant material collected, and the sieved abrasion-resistant material can be returned (recycled) into the scattering device.

The invention is explained in more detail below by describing an embodiment, with reference to the FIGURES in the drawings.

BRIEF DESCRIPTION OF THE DRAWING

FIG. 1 is a diagram of a production line for a wood-composite panel, using the process of the invention.

DESCRIPTION OF THE INVENTION

The production line presented diagrammatically in FIG. 1 comprises four double-applicator assemblies 1, 2, 3, 4 for the simultaneous application of the respective resin layer on the upper side and the underside of the unitized printed panels, e.g. of printed HDF panels, and also respectively four convection dryers 1*a*, 2*a*, 3*a*, 4*a* arranged behind the double-applicator assemblies in the direction of processing.

After the first applicator roll 1, there is moreover a first scattering device 10 provided for the uniform scattering of the abrasion-resistant material, e.g. corundum, onto the first resin layer on the upper side of the HDF panel. The first resin layer is then dried in the first convection dryer 1*a*.

This is followed by a second double-applicator unit 2 for the application of the second resin layer, and by a second convection dryer 2*a* for the drying of the second resin layer.

Downstream of the third double-applicator unit 3 for the application of the third resin layer, there can be a further scattering device 20 for the application of glass beads to the third resin layer, followed by a third convection dryer 3*a* for the drying of the third resin layer. The scattering device 20 for the glass beads is optional. The glass beads can also be applied together with the third resin layer.

After application of the fourth resin layer, which in the case of the fourth resin layer on the upper side can for example comprise cellulose fibers, in a fourth double-applicator unit 4 and drying in a fourth convection dryer 4*a*, the layer structure is pressed in a short-cycle press 5. The pressed panels are cooled and stored.

Embodiment 1

A stack of printed HDF (dark wood decorative effect) is unitized before the production line and is transported through the line at a velocity of 28 m/min.

In a first roll-applicator assembly, about 70 g of liquid melamine resin (solids content: 55% by weight) comprising the conventional auxiliaries (hardeners, wetting agents, etc.) are applied to the panel surface. The first roll-applicator assembly likewise applies a melamine resin to the panel underside (quantity applied: 60 g of liquid resin/m$^2$, solids content: about 55% by weight).

A scattering apparatus is then used to scatter 14 g of corundum/m$^2$ (F200) onto the surface. A distance of about 5 m before the dryer is reached allows the corundum to sink into the melamine resin. The panel then passes through a convection dryer. A quantity of 25 g/m$^2$ of the melamine resin layer (solids content: 55% by weight) is then applied. Again, this comprises the conventional auxiliaries. A roll-applicator assembly is likewise used to apply a melamine resin to the panel underside (quantity applied: 50 g of liquid resin/m$^2$, solids content: about 55% by weight). Again, the panel is dried in a convection dryer.

A melamine resin that additionally also comprises glass beads is then applied to the panel surface. The diameter of the beads is from 60 to 80 μm. The quantity applied of the resin is about 20 g of liquid melamine resin/m$^2$ (solids content: 61.5% by weight). The formulation also comprises a release agent, alongside the curing agent and the wetting agent. The quantity of glass beads applied is about 3 g/m$^2$. A roll-applicator assembly is likewise used to apply a melamine resin to the panel underside (quantity applied: 40 g of liquid resin/m$^2$, solids content: about 55% by weight). Again, the panel is dried in a convection dryer, and is then again coated with a melamine resin comprising glass beads. Cellulose (Vivapur 302) is present as further component. Again, about 20 g of liquid melamine resin/m$^2$ (solids content: 61.6% by weight) are applied. Here again, about 3 g of glass beads and 0.25 g of cellulose/m$^2$ are applied. The formulations also comprise a release agent, alongside the curing agent and the wetting agent. A roll-applicator assembly is likewise used to apply a melamine resin to the panel underside (quantity applied: 30 g of liquid resin/m$^2$, solids content: about 55% by weight). Again, the resin is dried in a convection dryer, and then the panel is pressed with a pressure of 400 N/cm$^2$ in a short-cycle press at 200° C. Press time was 10 seconds. Structure was provided by using a press platen with a wood structure.

For comparison, a panel with corundum applied by way of a roll applicator was pressed. The quantities of resin applied were at the same level as in the case of the scattered-corundum panel. Applicator units 1 to 2 here comprised corundum-containing formulations. In the final applicator units, the resins comprised glass beads or glass beads and cellulose. The quantity of corundum applied was determined gravimetrically as about 20 g/m$^2$. The performance of both samples in relation to abrasion was determined in accordance with DIN EN 15468. The transparency of the surface was assessed visually. The values obtained here were as follows:

| Sample<br>Test | Scattered corundum | Corundum from roll applicator |
|---|---|---|
| Performance in relation to abrasion (DIN EN 15468) (two determinations) | 4200/4400 Um. | 4000/4100 Um. |
| Transparency | Good transparency | Slight transparency problems in wood pores |

Embodiment 2

A stack of printed HDF (dark wood decorative effect) is unitized before the production line and is transported through the line at a velocity of 28 m/min.

In a first roll-applicator assembly, about 70 g of liquid melamine resin (solids content: 55% by weight) comprising the conventional auxiliaries (hardeners, wetting agents, etc.) are applied to the panel surface. The first roll-applicator assembly likewise applies a melamine resin to the panel underside (quantity applied: 60 g of liquid resin/m$^2$, solids content: about 55% by weight).

A scattering apparatus is then used to scatter 23 g of corundum/m$^2$ (F200) onto the surface. A distance of about 5 m before the dryer is reached allows the corundum to sink into the melamine resin. The panel then passes through a convection dryer.

A quantity of 25 g/m$^2$ of a second melamine resin layer (solids content: 55% by weight) is then applied. Again, this comprises the conventional auxiliaries. A roll-applicator assembly is likewise used to apply a second melamine resin to the panel underside (quantity applied: 50 g of liquid resin/m$^2$, solids content: about 55% by weight). Again, the panel is dried in a convection dryer.

Following the drying process, again a third melamine resin is applied by a roll assembly. The quantity applied of the resin is about 20 g of liquid melamine resin/m$^2$ (solids content: 61.5% by weight). The formulation also comprises a release agent, alongside the hardener and the wetting agent. A roll-applicator assembly is likewise used to apply a third melamine resin to the panel underside (quantity applied: 40 g of liquid resin/m$^2$, solids content: about 55% by weight). A scattering assembly is then used to scatter about 6 g of glass beads/m$^2$. The diameter of these was from 60 to 80 μm. Again, the panel is dried in a convection dryer and then again coated with a fourth melamine resin, which comprises cellulose (Vivapur 302). Again, about 20 g of liquid melamine resin/m$^2$ (solids content: 56.0% by weight) are applied. 0.25 g of cellulose/m$^2$ is applied here. A roll-applicator assembly is likewise used to apply a fourth melamine resin to the panel underside (quantity applied: 30 g of liquid resin/m$^2$, solids content: about 55% by weight). The formulations also comprise a release agent, alongside the hardener and the wetting agent. Again, the resin is dried in a convection dryer, and the panel is then pressed with a pressure of 400 N/cm$^2$ in a short-cycle press at 200° C. Press time is 10 seconds. Structure was provided by using a press platen with a wood structure.

For comparison, a panel with corundum applied by way of a roll applicator was pressed. The quantities of resin applied in the case of this panel were about 20 g/m$^2$ (solid) higher than for the scattered-corundum panel. Corundum-containing formulations were used in the first three applicator units here. In the final applicator unit, the melamine resin comprised glass beads and cellulose. The quantities applied of the two components were comparable with those for the scattered panel. The quantity of corundum applied was determined gravimetrically as about 30 g/m$^2$. The performance of both samples in relation to abrasion was determined in accordance with DIN EN 15468. The transparency of the surface was assessed visually. The values obtained here were as follows:

| Sample<br>Test | Scattered corundum | Corundum from roll applicator |
|---|---|---|
| Performance in relation to abrasion (DIN EN 15468) (two determinations) | 6300/6500 Um. | 6200/5950 Um. |
| Transparency | Good transparency | Greater transparency problems in wood pores and across the entire surface |

Embodiment 3

In a large-scale trial, 10 000 printed HDF panels (format: 5600×2070 mm dark wood decorative effect) were unitized for the production line and transported through the line at a velocity of 28 m/min.

In a first roll-applicator assembly, about 70 g of liquid melamine resin (solids content: 55% by weight) comprising the conventional auxiliaries (hardeners, wetting agents, etc.) are applied to the panel surface. A roll-applicator assembly likewise applies a melamine resin to the panel underside (quantity applied: 60 g of liquid resin/m$^2$, solids content: about 55% by weight).

A scattering apparatus is then used to scatter 23 g of corundum/m$^2$ (F200) onto the surface. A distance of about 5 m before the dryer is reached allows the corundum to sink into the melamine resin. The panel then passes through a convection dryer.

A quantity of 25 g/m$^2$ of a second melamine resin layer (solids content: 55% by weight) is then applied. Again, this comprises the conventional auxiliaries. A roll-applicator assembly is likewise used to apply a second melamine resin to the panel underside (quantity applied: 50 g of liquid resin/m$^2$, solids content: about 55% by weight). Again, the panel is dried in a convection dryer.

Following the drying process, again melamine resin is applied by a roll assembly. The quantity applied of the resin is about 20 g of liquid melamine resin/m$^2$ (solids content: 61.5% by weight). The formulation also comprises a release agent, alongside the hardener and the wetting agent. A roll-applicator assembly is likewise used to apply a melamine resin to the panel underside (quantity applied: 40 g of liquid resin/m$^2$, solids content: about 55% by weight). A scattering assembly is then used to scatter about 6 g of glass beads/m$^2$. The diameter of these was from 60 to 80 μm. Again, the panel is dried in a convection dryer and then again coated with melamine resin, which comprises cellulose (Vivapur 302). Again, about 20 g of liquid melamine resin/m$^2$ (solids content: 56.0% by weight) are applied. 0.25 g of cellulose/m$^2$ is applied here. A roll-applicator assembly is likewise used to apply a melamine resin to the panel underside (quantity applied: 30 g of liquid resin/m$^2$, solids content: about 55% by weight). The formulations also comprise a release agent, alongside the hardener and the wetting agent. Again, the resin is dried in a convection dryer, and the panel is then pressed with a pressure of 400 N/cm$^2$ in a short-cycle press at 200° C. Press time is 10 seconds. Structure was provided by using a press platen with a wood structure.

For comparison, 10 000 panels with corundum applied by way of a roll applicator were pressed. The quantities of resin applied in the case of these panels were about 20 g/m$^2$ (solid) higher than for the scattered-corundum panel. Corundum-containing formulations were used in the first three applicator units here. In the final applicator unit, the melamine resin comprised glass beads and cellulose. The quantities applied of the two components were comparable with those for the scattered panel. The quantity of corundum applied was determined gravimetrically as about 30 g/m$^2$. The performance of both samples in relation to abrasion was determined in accordance with DIN EN 15468. The transparency of the surface was assessed visually. The values obtained here were as follows:

| Sample Test | Scattered corundum (after 10 000 pressings) | Corundum from roll applicator (after 10 000 pressings) |
|---|---|---|
| Gloss level change*) measured (Initial value: 15 gloss points) | −1 gloss point | −4 gloss points |
| Visual assessment of gloss level change | No noticeable change | Clearly visible wear at the corners of the press platens |

*)Gloss level was measured with a gloss level tester from Dr. Lange at a measurement angle of 60°, DIN EN 13 722: 2004-10

What is claimed is:

1. A production line for producing an abrasion-resistant wood-composite panel which has at least one decorative layer on the upper surface, the production line comprising:

at least one first application device for applying a first resin layer to the upper surface and/or lower surface of a core board, at least one scattering device arranged downstream of the first application device in a direction of processing for scattering a predetermined quantity of abrasion-resistant particles the at least one scattering device comprises a hopper, a rotating structured spreading roller, and a scraper;

at least one first drying device arranged downstream of the first application device and scattering device in the direction of processing for drying the first upper and/or lower resin layer;

at least one second application device arranged downstream of the first drying device in the direction of processing for applying a second resin layer to the upper side and/or lower side of the core board;

at least one second drying device arranged downstream of the second application device in the direction of processing for drying the second upper and/or lower resin layer; and at least one short-cycle press, wherein the at least one scattering device is controlled by a light barrier, and at least one hopper for collecting excess abrasion-resistant particles is provided upstream of the spreader roller in the direction of processing.

2. The production line according to claim 1, wherein the at least one scattering device comprises an oscillating brush system.

3. The production line according to claim 1, wherein the light barrier is arranged upstream of the spreader roller in the direction of processing.

4. The production line according to claim 2, wherein the hopper is coupled to at least one conveyor device and a screening device, and wherein the excess abrasion-resistant material collected in the hopper is transported to the screening device via the conveyor device.

5. The production line according to claim 4, wherein screen meshes of the screening device correspond to the largest used grain of the abrasion-resistant particulate material.

6. The production line according to claim 1, wherein the at least one scattering device is arranged in at least one booth provided with at least one means for removing dust occurring in the booth.

7. The production line according to claim 6, wherein the means for removing the dust is in the form of a suction device and/or a device for blowing in air by means of nozzles.

8. The production line according to claim 1, further comprising:

at least one third application device arranged downstream of the second drying device in the direction of processing for applying a third resin layer to the upper side and/or lower side of the core board, at least one third drying device arranged downstream of the third application device in the direction of processing for drying the third upper and/or lower resin layers;

at least one fourth application device arranged downstream of the third drying device in the direction of processing for applying a fourth resin layer to the upper side and/or lower side of the core board;

at least one fourth drying device arranged downstream of the fourth application device in the direction of processing for drying the fourth upper and/or lower resin layers; and at least one short-cycle press arranged downstream of the fourth drying device in the direction of processing.

9. The production line according to claim 8, wherein a scattering device for scattering glass balls is provided downstream of the third application device in the direction of processing.

10. The production line according to claim 1, wherein the at least one first drying device arranged downstream of the first application device and scattering device in the direction of processing direction dries the lower resin layer.

11. The production line of claim 1, wherein the at least one decorative layer is a printed decorative layer.

* * * * *